Dec. 31, 1929.　　　D. A. MILLER　　　1,741,707
SOLDERING IRON
Filed Nov. 30, 1928　　2 Sheets-Sheet 1
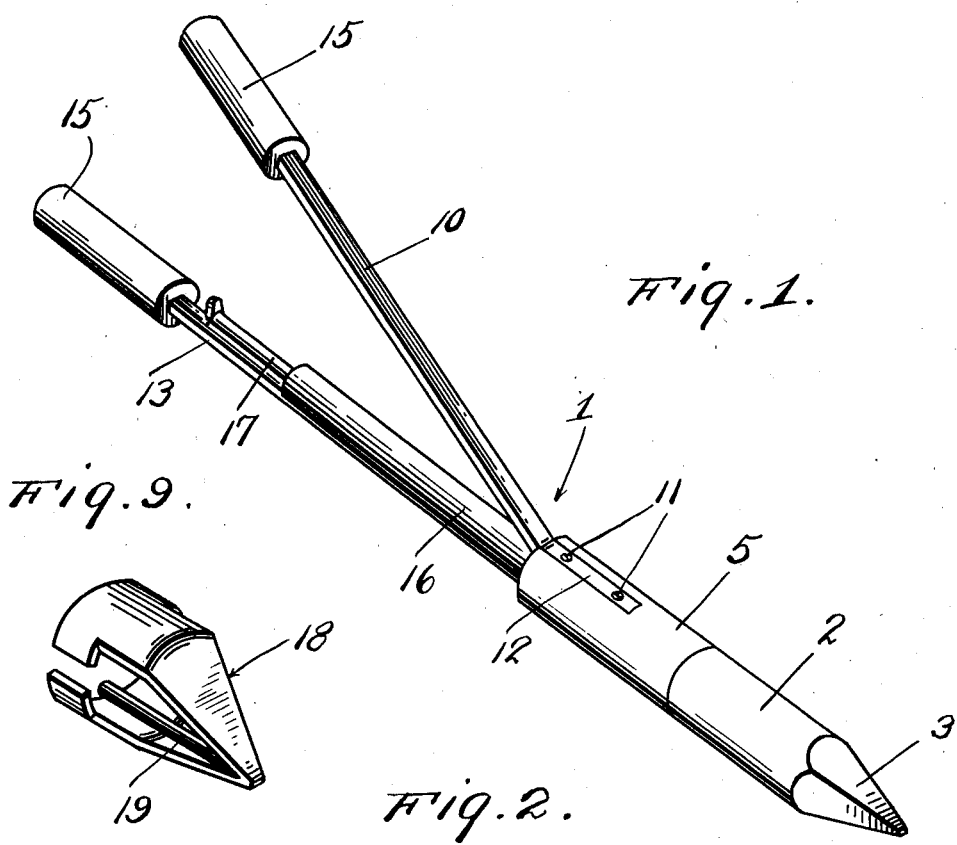
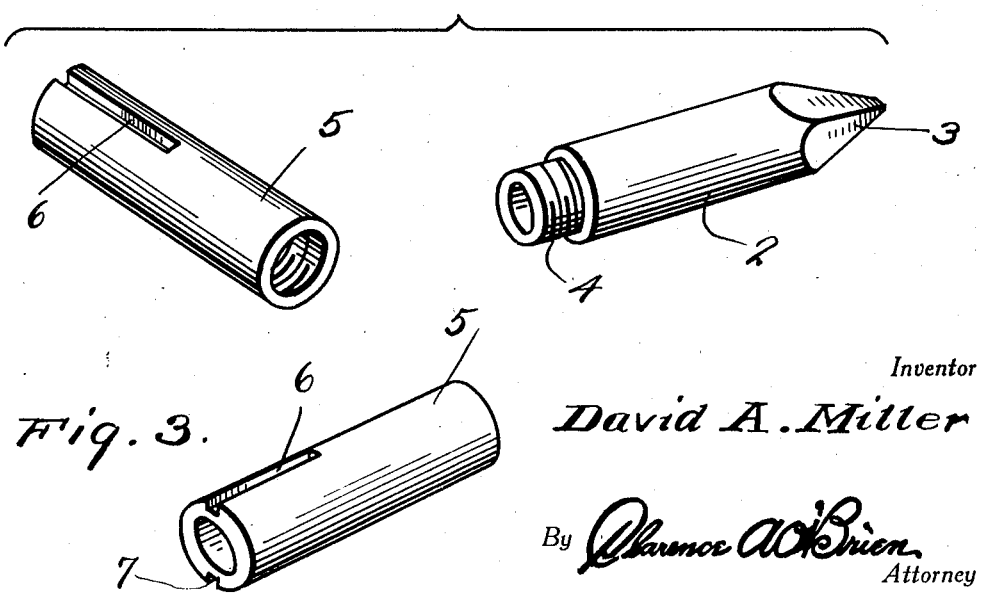
Inventor
David A. Miller
By　Clarence A. O'Brien
Attorney Dec. 31, 1929.  D. A. MILLER  1,741,707
SOLDERING IRON
Filed Nov. 30, 1928  2 Sheets-Sheet 2
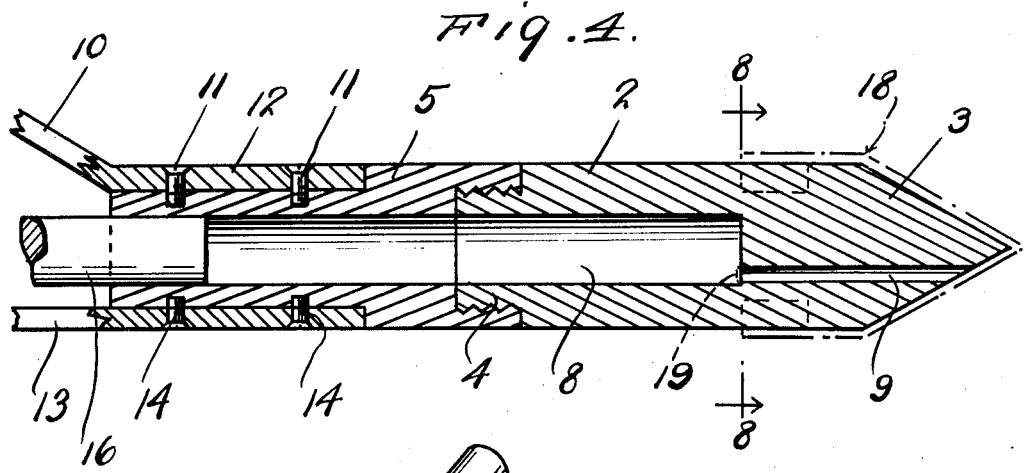
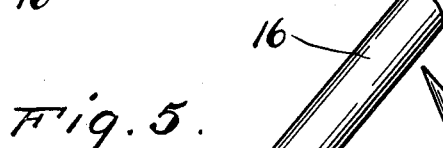
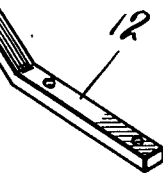
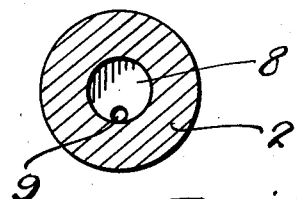
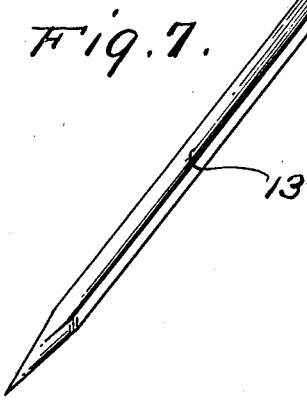
Inventor
David A. Miller
By Clarence A. O'Brien
Attorney Patented Dec. 31, 1929

1,741,707

UNITED STATES PATENT OFFICE

DAVID A. MILLER, OF CAMPBELLTOWN, PENNSYLVANIA

SOLDERING IRON

Application filed November 30, 1928. Serial No. 322,821.

The present invention relates to improvements in soldering irons and has for its principal object to provide a tool wherein the soldering head is of hollow construction whereby to provide a chamber for receiving the solder, the head being heated to melt the solder in the chamber, the pointed end of the head being formed with a respective passage through which the molten solder flows during the use of the soldering iron; a manually operable piston being arranged for movement within the chamber to feed the solder toward the discharge passage.

A further object is to provide a soldering iron of such character that includes a novel cap for disposition over the pointed end of the soldering head when the tool is not in use, a pin being carried by the cap for closing the discharge passage so that the soldering in the chamber cannot escape.

A further and important object resides in the provision of a soldering iron of the above mentioned character that includes a pair of shanks attached at their forward ends to the rear end portion of the soldering head, suitable handles being arranged on the rear end of the shank to facilitate the handling of the tool.

A further object is to provide a soldering iron of the above mentioned character wherein the parts are so arranged as to permit the same to be readily and easily assembled or disassembled, the iron being at all times positive and efficient in its operation and furthermore tending to save considerable time and labor as well as preventing waste of the solder.

Still a further object is to provide a soldering iron of the above mentioned character which is simple in construction, inexpensive, strong and durable and further well adapted to the purposes for which it is designed.

Other objects and advantages will become apparent during the course of the following description.

In the accompanying drawing, forming a part of this specification, and in which like numerals indicate like parts throughout the same:

Figure 1 is a perspective view of the soldering iron embodying my invention,

Figure 2 is a group perspective view of the parts of the soldering head,

Figure 3 is a detail perspective view of the rear tubular section of the sectional soldering pin, Figure 4 is a longitudinal sectional view through the soldering head and the adjacent portions of the shanks and showing the forward end portion of the piston disposed in the rear end portion of the solder receiving chamber, Figure 5 is a detail perspective view of the piston or plunger forming a salient part of the present invention, Figure 6 is a detail perspective view of one of the shanks, Figure 7 is a similar view of another one of said shanks, Figure 8 is a sectional view taken approximately on the line 8—8 of Figure 4 looking in the direction of the arrows, and Figure 9 is a detail perspective view of the cap members for the pointed end of the soldering head.

In the drawings wherein for the purpose of illustration is shown a preferred embodiment of my invention, the numeral 1 designates generally my improved soldering iron, the same comprising a sectional soldering head which includes the forward tubular section that is formed at its forward end with the solid tapered portion 3, said tapered portion being formed with flat faces.

The rear end of the forward section 2 is formed with a reduced externally threaded neck 4 that is threaded within the forward end of the tubular rear section 5 and as is clearly indicated in Figures 2 and 3, the rear end portion of the tubular rear section 5 is formed at diametrically opposite points with the longitudinally extending grooves or channels 6 and 7 respectively, the purpose of which will be presently described.

The tubular sections 2 and 5 of the soldering head when assembled together form a central longitudinally extending solder receiving chamber 8 that extends from the rear end of the soldering head to the solid portion 3 and a restricted passage 9 extends longitudinally through the solid pointed end 3 to afford communication between the chamber 8 and the bottom flat face of the pointed portion 3 as suggested in Figure 4.

The sections of the soldering pin are preferably constructed of copper. An upwardly inclined steel shank 10 has its forward end disposed substantially horizontally for disposition within the groove or channel 6 and suitable screws 11 extend through the horizontal portion 12 of the shank 10, threaded in the tubular rear section 5 for rigidly securing the forward end portion of the flat steel shank 10 to the rear end portion of the soldering head.

A similar flat steel shank 13 is secured at its forward end in the channel or groove 7 by similar fastening screws 14 and wooden handles 15 are arranged on the rear end of the heel shank.

Also forming a salient part of the present invention is the elongated steel piston or plunger 16 that is arranged for reciprocatory movement through the open rear end of the chamber 8, a suitable handle 17 extending rearwardly from the rear end of the piston 16 for actuating the same.

In use, the chamber 8 is filled with solder and the soldering head is heated by means of a blow torch or the like for the purpose of melting a solder in the chamber. The soldering iron is then taken with the hand and the handle 15 and with the thumb at the end of the handle 17, a piston or plunger 16 may be actuated to regulate the flow of the molten solder from the chamber through the passage 9.

In this manner, two pieces of metal may be soldered together in any position or angle and furthermore the soldering iron may be used to solder underneath the joints in a simple and efficient manner.

When not in use, a cap such as is shown generally at 18 in Figure 9 is fitted over the pointed end 3 of the soldering head and carried by this cap is the elongated pin 19 that is adapted to extend into the passage 9 for closing the same so that the solder cannot accidentally flow out of the chamber through the passage.

It will thus be seen from the foregoing description, that I have provided an improved soldering iron that will at all times be positive and efficient in carrying out the purpose for which it is designed and furthermore the simplicity of the device enables the parts to be readily and easily assembled or disassembled whenever necessary.

While I have shown the preferred embodiment of my invention, it is to be understood that various changes in the size, shape and arrangement of parts may be resorted to without departing from the spirit of the invention and the scope of the appended claims.

Having thus described my invention, what I claim as new is:

1. In a soldering iron, a soldering head formed with a solder receiving chamber in the rear portion thereof, the forward end of the head being tapered and formed with a restricted passage and has communication with the forward head of the chamber, a handle extending rearwardly from the soldering head, a manually operable piston movable in the chamber for feeding the molten solder to the discharge passage in the pointed forward end of the head and a removable cap for the forward end of the head comprising a pair of substantially V-shaped resilient flat metallic arms terminating in opposed parallel end portions of arcuate cross section for frictionally gripping the sides of the head, and an elongated pin mounted on said cap adjacent its forward end and extending rearwardly therein for insertion in the restricted passage.

2. In a soldering iron, a soldering head formed with a solder receiving chamber in the rear portion thereof, the forward end of the head terminating in a tapered polygonal soldering point and formed with a restricted passage below its longitudinal center having communication with the forward end of the chamber and the outer surface of the head rearwardly of the point, a handle extending rearwardly from the soldering head, and a manually operable piston movable in the chamber for feeding the molten solder to the discharge passage in the pointed forward end of the head, a removable cap for the forward end of a soldering head, and a pin carried by the cap for disposition within the passage when the cap is fitted over the forward end of the head to close said passage.

3. In a soldering iron, a soldering head formed with a solder receiving chamber in the rear portion thereof, the forward end of the head being pointed and formed with a longitudinally extending restricted passage that communicates with the forward end of the chamber, a pair of shanks secured at their forward ends to the rear end portion of the soldering head at diametrically opposite points, one of the shanks being disposed upwardly at an incline, handles on the rear ends of the shanks, a piston operable within the rear portion of the chamber for feeding the molten solder to the restricted passage in the pointed forward end of the head, and a handle on the rear end of the piston for operating the same, a cap removably fitted over the pointed forward end of the soldering head, and a pin carried by the cap for disposition within the restricted passage in the forward end portion of the soldering head when the cap is in position on the head for closing the passage.

In testimony whereof I affix my signature.

DAVID A. MILLER.